United States Patent
Oh et al.

(10) Patent No.: US 8,434,725 B2
(45) Date of Patent: May 7, 2013

(54) QUICK THREADED ROD LOCKING DEVICES AND METHOD

(75) Inventors: Michael H. -S. Oh, Twinsburg, OH (US); Jeffrey K. Jackson, Sagamore Hills, OH (US)

(73) Assignee: ERICO International Corporation, Solon, OH (US)

( * ) Notice: Subject to any disclaimer, the term of this patent is extended or adjusted under 35 U.S.C. 154(b) by 0 days.

(21) Appl. No.: 13/417,370

(22) Filed: Mar. 12, 2012

(65) Prior Publication Data
US 2012/0167358 A1 Jul. 5, 2012

Related U.S. Application Data

(63) Continuation of application No. 12/609,079, filed on Oct. 30, 2009, now Pat. No. 8,132,767.

(60) Provisional application No. 61/109,548, filed on Oct. 30, 2008.

(51) Int. Cl.
| | |
|---|---|
| *A47B 96/06* | (2006.01) |
| *A47G 29/00* | (2006.01) |
| *A47K 1/00* | (2006.01) |
| *E04G 5/06* | (2006.01) |
| *F21V 35/00* | (2006.01) |

(52) U.S. Cl.
USPC .......... 248/214; 248/220.21; 248/222.14; 411/265

(58) Field of Classification Search ............ 248/214, 248/222.14, 220.21; 411/265, 237, 270; 403/307, 301
See application file for complete search history.

(56) References Cited

U.S. PATENT DOCUMENTS

| | | | |
|---|---|---|---|
| 516,555 A | 3/1894 | Smith | |
| 544,724 A | 8/1895 | Cotton et al. | |
| 849,832 A | 4/1907 | Collins | |
| 862,840 A * | 8/1907 | Collins | ............ 248/60 |

(Continued)

FOREIGN PATENT DOCUMENTS

| | | |
|---|---|---|
| CH | 687221 A5 | 10/1996 |
| JP | 2002168222 A | 6/2002 |
| JP | 2005127429 A | 5/2005 |

OTHER PUBLICATIONS

"Electrical and Low Voltage/Datacom Fasteners", Erico Caddy, Copyright 2003, 7 pgs.

(Continued)

*Primary Examiner* — Amy J Sterling
(74) *Attorney, Agent, or Firm* — Renner, Otto, Boisselle & Sklar, LLP

(57) ABSTRACT

A threaded rod hanger has quick lock plunger mechanism that includes plunger pieces within a tapered bore in a housing. The plunger pieces have tapered outer surfaces. A spring within the housing presses the plunger pieces toward the narrow end of the bore, with the spring located between the plunger pieces and a back plate that closes off part of a wide end of the tapered bore. The plunger pieces have internally threaded surfaces that engage threads on a threaded rod that is inserted into the bore, between the plunger pieces. Once the threaded rod has been inserted between the plunger pieces and released, the plunger pieces are pushed toward the narrow bore end. This causes the plunger pieces to press inward, automatically causing the internal plunger half threads to engage the external threads on the threaded rod.

30 Claims, 9 Drawing Sheets

U.S. PATENT DOCUMENTS

| | | | | |
|---|---|---|---|---|
| 1,069,135 | A | * | 8/1913 | Heberling ............ 24/132 R |
| 1,144,403 | A | * | 6/1915 | Powers ............ 188/222.1 |
| 1,144,430 | A | * | 6/1915 | Powers ............ 269/204 |
| 1,257,040 | A | * | 2/1918 | Steuernagel ............ 269/204 |
| 1,391,457 | A | * | 9/1921 | Buckley et al. ............ 294/74 |
| 1,495,258 | A | | 5/1924 | Duty |
| 1,547,677 | A | | 7/1925 | Ouellet |
| 1,674,045 | A | | 6/1928 | James |
| 1,792,439 | A | | 2/1931 | Nelson |
| 1,875,274 | A | | 8/1932 | Soule |
| 1,959,985 | A | | 5/1934 | Moll |
| 2,177,816 | A | | 10/1939 | Wertman |
| 2,190,661 | A | | 2/1940 | Hauer |
| 2,315,196 | A | | 3/1943 | Gallione |
| 2,327,683 | A | | 8/1943 | Warner et al. |
| 2,356,209 | A | | 8/1944 | Brilhart |
| 2,476,731 | A | | 7/1949 | Hobbs, Jr. |
| 2,487,853 | A | | 11/1949 | Coons |
| 2,520,325 | A | | 8/1950 | Moore |
| 2,572,615 | A | | 10/1951 | Hansen |
| 2,679,709 | A | | 6/1954 | DuBois |
| 2,819,923 | A | | 1/1958 | Anderson |
| 2,893,670 | A | | 7/1959 | Adams, Jr. |
| 2,998,625 | A | | 9/1961 | Huber |
| 3,058,713 | A | | 10/1962 | Nemire et al. |
| 3,094,755 | A | | 6/1963 | Casanave |
| 3,171,624 | A | | 3/1965 | Leahy |
| 3,341,909 | A | | 9/1967 | Havener |
| 3,564,664 | A | | 2/1971 | Dage |
| 4,019,705 | A | | 4/1977 | Habuda, Sr. et al. |
| 4,129,927 | A | | 12/1978 | Anderson |
| 4,178,661 | A | | 12/1979 | Klein |
| 4,216,568 | A | | 8/1980 | Anderson |
| 4,266,756 | A | | 5/1981 | Anderson |
| 4,406,047 | A | | 9/1983 | Jeffers et al. |
| 4,424,609 | A | | 1/1984 | Boden |
| 4,519,564 | A | | 5/1985 | Nadherny |
| 4,570,885 | A | | 2/1986 | Heath |
| 4,943,016 | A | | 7/1990 | Hennecke |
| 4,974,888 | A | | 12/1990 | Childers |
| 5,020,192 | A | | 6/1991 | Gerlach |
| 5,081,811 | A | | 1/1992 | Sasaki |
| 5,147,145 | A | | 9/1992 | Facey et al. |
| 5,282,825 | A | | 2/1994 | Muck et al. |
| 5,423,108 | A | | 6/1995 | Brennan |
| 5,548,873 | A | | 8/1996 | Macias |
| 5,551,901 | A | | 9/1996 | Jaeger |
| 5,947,424 | A | | 9/1999 | Heath |
| 6,003,210 | A | | 12/1999 | Facey et al. |
| 6,012,691 | A | | 1/2000 | van Leeuwen et al. |
| 6,031,508 | A | | 2/2000 | Ishizuka et al. |
| 6,058,574 | A | | 5/2000 | Facey et al. |
| 6,098,942 | A | | 8/2000 | Heath |
| 6,898,905 | B1 | | 5/2005 | Kirschner |
| 7,039,987 | B2 | | 5/2006 | van Gijsel et al. |
| 7,150,078 | B2 | | 12/2006 | van Gijsel et al. |
| 7,346,962 | B2 | | 3/2008 | van Gijsel et al. |
| 8,132,767 | B2 | | 3/2012 | Oh et al. |
| 2005/0042059 | A1 | | 2/2005 | Bremer |
| 2005/0230582 | A1 | | 10/2005 | Birli et al. |
| 2006/0214073 | A1 | | 9/2006 | Mominee et al. |
| 2008/0277536 | A1 | | 11/2008 | Olle et al. |

OTHER PUBLICATIONS

"Fixing and Supports for Heating and Plumbing Installations", Erico Caddy, 3 pgs.
"Spring Steel Fasteners", B-Line, Copyright 1995, 5 pgs.
"Speed Link, Universal Support System", Erico Caddy, Copyright 2003, 8 pgs.
Related U.S. Appl. No. 12/539,650, filed Aug. 12, 2009.

* cited by examiner

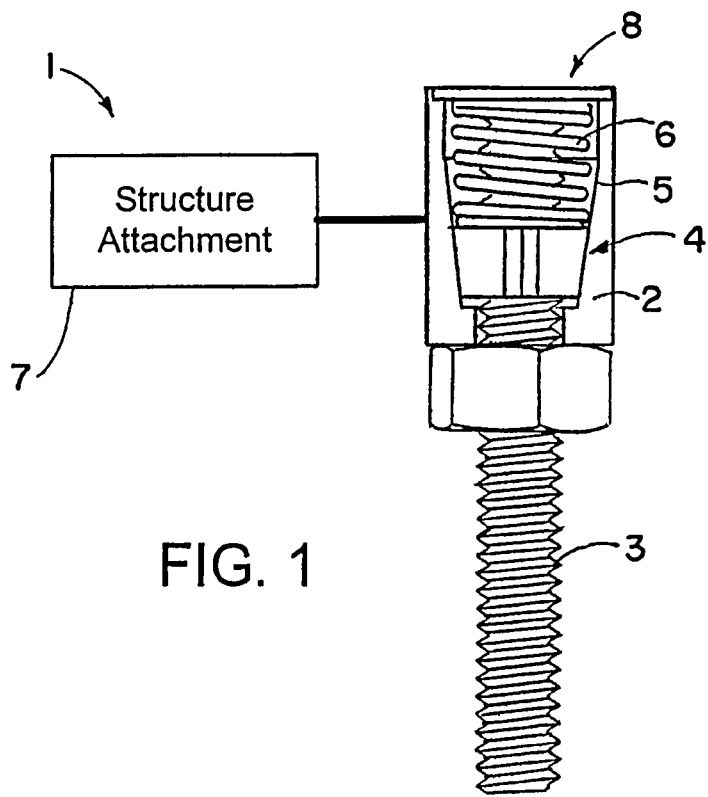
FIG. 1
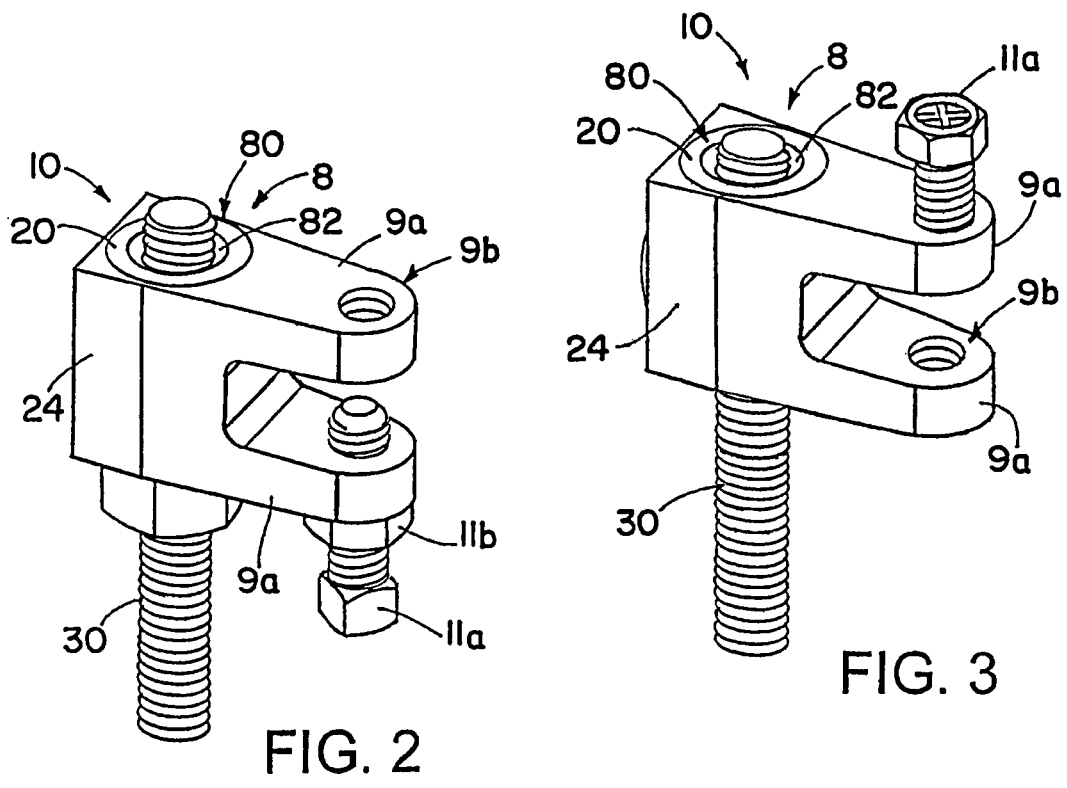
FIG. 2
FIG. 3

QUICK THREADED ROD LOCKING DEVICES AND METHOD

This application is a continuation of U.S. application Ser. No. 12/609,079, filed Oct. 30, 2009 now U.S. Pat. No. 8,132,767 which claims priority under 35 USC 119 from U.S. Provisional Application No. 61/109,548, filed Oct. 30, 2008. The above applications are incorporated herein by reference in their entireties.

BACKGROUND OF THE INVENTION

1. Field of the Invention

The invention is in the field devices for locking onto threaded rods.

2. Description of the Related Art

ERICO International Corp. sells the CADDY® SPEED LINK product family as a quick cable locking system that provides a means to suspend static loads from ceilings, structures, and sub-structures. However, prior items in the SPEED LINK product family have not included any quick threaded rod locking devices.

In recent years, installers in the field are increasingly using pre-fabricated, sub-assembled parts in order to maximize their installation labor savings. When installers install the pre-fabricated sub-assemblies on ceilings, structures, and sub-structures in the field, the installers cannot assemble them together without rotating threaded rod unless they disassemble the pre-fabricated sub-assemblies, because the threaded rod is a part of the pre-fabricated sub-assemblies. With the conventional beam clamps, conventional anchor bolts, and conventional strut nuts, the threaded rods have to be rotated into internal threads on the mating parts such as beam clamps, anchor bolts and strut nuts.

SUMMARY OF THE INVENTION

A new concept quick threaded rod locking device does not need to rotate the threaded rod into internal threads on the mating parts such as beam clamps, anchor bolts and strut nuts during assembly. Whenever the installers push the threaded rod into the quick threaded rod locking devices, the external threads on the threaded rod may be automatically locked together with internal threads on mating parts. The load rating will be the same as conventional beam clamps, anchor bolts and strut nuts so that installers can use for any applications —either electrical, mechanical or both. If installers want to adjust the height adjustment by rotating the threaded rod, the installers can rotate the threaded rod as well with newly developed quick threaded rod locking devices.

According to an aspect of the invention, a threaded rod locking mechanism includes two halves of a plunger, a taper bore on a housing, a shoulder taper spring, and a back plate or housing insert.

According to another aspect of the invention, a threaded rod locking mechanism includes halves with minor diameter and gap distance between a center "A" and a center "B" on the two halves.

According to yet another aspect of the invention, a beam clamp has two thread holes on the beam clamp legs, and a quick locking mechanism, to allow bottom mounting.

According to still another aspect of the invention, a quick locking mechanism includes a shoulder taper spring configured so as not to derail the spring from two halves of the plungers of the locking mechanism.

According to a further aspect of the invention, a quick lock anchor bolt includes a housing insert that has a taper bore.

According to a still further aspect of the invention, a quick lock strut nut includes a strut nut housing that has two wings and a jam nut.

According to another aspect of the invention, a threaded rod hanger includes: a housing having a tapered bore therein, wherein the tapered bore has a wide end and a narrow end; and a threaded rod locking mechanism. The threaded rod locking mechanism includes: plunger pieces movable within the tapered bore, wherein the plunger pieces have outer surfaces that engage the bore, and threaded inner surfaces; and a spring within the tapered bore providing a spring force biasing the plunger pieces toward the narrow end of the tapered bore. Contact between the outer surfaces of the plunger pieces and a bore surface at the narrow end of the tapered bore drives the plunger pieces toward one another and toward an axis of the tapered bore. The plunger piece outer surfaces may be sloped.

According to yet another aspect of the invention, a method of securing a threaded rod or to a threaded rod includes the steps of: providing a threaded rod hanger, wherein the threaded rod hanger includes: a housing having a tapered bore therein, wherein the tapered bore has a wide end and a narrow end; and a threaded rod locking mechanism, wherein the threaded rod locking mechanism includes: plunger pieces movable within the tapered bore, wherein the plunger pieces have outer surfaces that engage the bore, and threaded inner surfaces; and a spring within the tapered bore providing a spring force biasing the plunger pieces toward the narrow end of the tapered bore; inserting a threaded rod through the narrow end of the tapered bore, wherein the inserting moves the plunger pieces away from an axis of the tapered bore, and moves the plunger pieces in an axial direction, against the spring force; and after the inserting, releasing insertion force, causing the plunger pieces to move toward the axis, with the threaded inner surfaces of the plunger pieces engaging external threads of the threaded rod.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

FIG. 1 is a partially-schematic view of a threaded rod hanger in accordance with an embodiment of the invention.

FIG. 2 is an oblique view of one type of threaded rod hanger according to an embodiment of the invention, a beam clamp, in a first configuration.

FIG. 3 is an oblique view the beam clamp of FIG. 2, in a second configuration.

DETAILED DESCRIPTION

Figure 4:
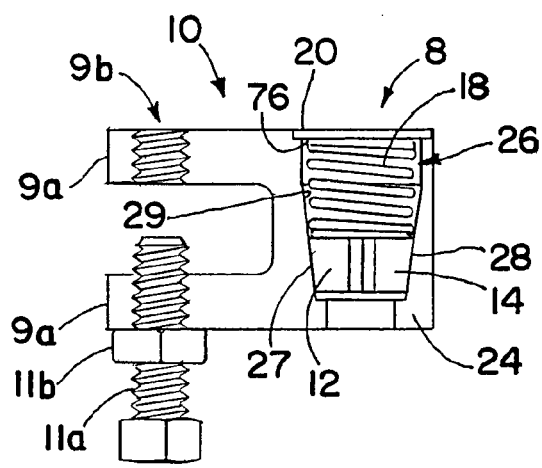
FIG. 4 is a cutaway view of the beam clamp of FIG. 2.

A threaded rod hanger has quick lock plunger mechanism that includes plunger pieces within a tapered bore in a housing. The plunger pieces have tapered outer surfaces and are spring-biased to position themselves toward the narrow end of the tapered bore. A spring within the housing presses the plunger pieces toward the narrow end of the bore, with the spring located between the plunger pieces and a back plate that closes off part of a wide end of the tapered bore. The plunger pieces have internally threaded surfaces that engage threads on a threaded rod that is inserted into the bore, between the plunger pieces. The plunger pieces have chamfers that aid in directing the threaded rod in between the plunger pieces. Once the threaded rod has been inserted between the plunger pieces and released, the plunger pieces are pushed toward the narrow bore end. This causes the plunger pieces to press inward, automatically causing the internal plunger half threads to engage the external threads on the threaded rod.

FIG. 1 shows a threaded rod hanger 1 that includes a quick lock plunger mechanism 8 in a housing 2. The plunger mechanism 8 is used for threadedly engaging and holding a threaded rod 3. As explained in greater detail below, the plunger mechanism 8 includes plunger parts or pieces 4 that are located in a tapered bore 5 in the housing 2. A spring 6 biases the plunger parts 4 toward a narrow end of the tapered bore 5, a position that presses the plunger parts 4 inward toward the threaded rod 3. This causes threads on radially inward surfaces of the plunger parts 4 to engage the external threads on the rod 3, securing the rod within the housing 2. In addition, it is possible to turn the rod 3, threading the rod 3 further into or out of the bore 5, providing height adjustment as needed.

The threaded rod hanger 1 has a structure attachment 7 for attaching the rod hanger 1 to some sort of building structure, or for hanging items from threaded rods. The structure attachment 7 may have any of a variety of suitable forms for attaching to different types of structure, producing different types of rod hangers. For example the rod hanger may be a beam clamp, with the structure attachment being able to clamp onto the flange of a beam or other device (plate, pipe, etc.), such as by a screw clamping the flange (or other structure) against a jaw portion or leg. As another example the rod hanger may be an anchor bolt that has a screw portion configured to be installed on concrete ceilings and/or decking. In a further example the rod hanger may be a strut nut that engages a channel, which may be attached to a ceiling, for example. It will be appreciated that these are only a few of the many possible configurations and types of structural attachment that may be utilized in the rod hanger.

The various embodiment threaded rod hangers described herein may be made of any of a variety of suitable materials. An example suitable material is steel, but it will be appreciated that other materials may be used alternatively or in addition.

FIGS. 2 and 3 show a beam clamp 10 that includes a quick lock plunger mechanism 8 in accordance with an embodiment of the present invention. The quick lock plunger mechanism 8 is adapted into the beam clamp 10 as a part of a quick lock beam clamp 10. Such quick lock beam clamps 10 may be configured for up to 0.5 inch (12.7 mm) flange thickness in order to minimize the beam clamp size. The quick lock beam clamp 10 shown on FIG. 1 may be used for hanging a mechanical sprinkler pipe.

The quick lock beam clamp configuration shown in FIG. 3 is configured for general electrical applications. This configuration may be used to engage 0.25 inch (6.4 mm) or M6 threaded rods, for example. It will be appreciated that the uses and sizes are only examples, and the clamp 10 in its various configurations can be used in other ways, and may have different sizes from those described.

The structure attachment of the beam clamp 10 may involve a pair of jaw portions or legs 9a for receiving a flange or other part therebetween. The jaw portions or legs 9a extend from a housing of the beam clamp 10. The legs 9a and the housing may be parts of a single monolithic piece of material. Threaded holes 9b in each of the jaw portions (or legs) 9a may be used for receiving a bolt 11a, which may be used to secure the flange or other part by pressing it against the opposite jaw portion. A nut 11b may be threaded onto the bolt 11a in order to aid in securing the bolt 11a in place. The bolt 11a may have any of a variety of configurations, including a square-head configuration (FIG. 2) or a hex-head configuration (FIG. 3).

Figure 5:
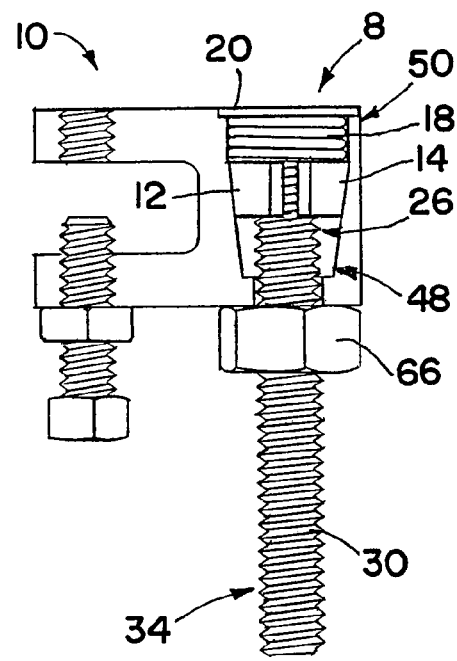
FIG. 5 is a cutaway view of the beam clamp of FIG. 2, with a threaded rod being inserted.
Figure 6:
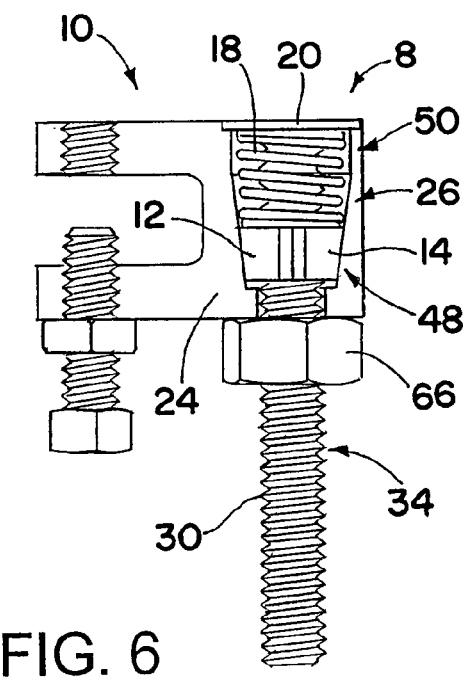
FIG. 6 is a cutaway view of the beam clamp of FIG. 2, with the threaded rod inserted and locked in place.

With reference now in addition to FIGS. 4-6, the threaded rod locking mechanism 8 of the beam clamp 10 (or either configuration) includes two plunger halves (plunger pieces) 12 and 14, a shoulder taper spring 18, a back plate 20, and a housing 24 that has a tapered bore 26. The plunger pieces 12 and 14 are located within the threaded bore 26, and have external surfaces 27 and 28 that can be in contact with an internal surface 29 of the bore 26. The external plunger surfaces 27 and 28 may be smooth, to allow them to slide easily along the smooth bore internal surface 29. The external plunger surfaces 27 and 28 may be sloped, for example substantially matching a slope in a sloped portion of the bore internal surface 29.

The plunger pieces 12 and 14 may each have a substantially semiannular shape (half of an annular shape). Together the plunger pieces 12 and 14 define an opening between them, through which a threaded rod 30 may be received.

FIG. 5 shows the threaded rod 30 pushed through the plunger set 12 and 14. FIG. 6 shows the locking mechanism 8 when the pushing of the threaded rod 30 is stopped. In this configuration internal threads 32 (FIG. 7) on the plunger set 12 and 14 are matched with and engage external threads 34 on the threaded rod 30. This configuration is maintained by spring force from the taper spring 18 pressing the plunger pieces 12 and 14 against the tapered bore 26 of the housing 24 of the beam clamp or other device 10.

Figure 7:
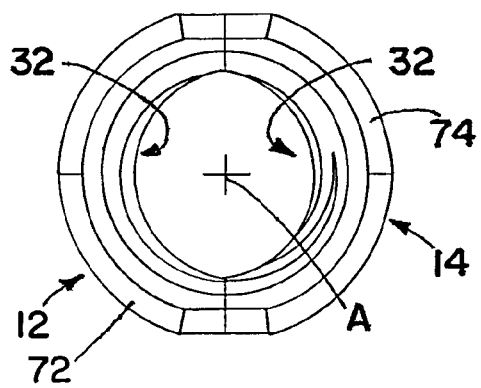
FIG. 7 is a top view of a plunger set of the beam clamp of FIG. 2, with the plunger pieces together.
Figure 8:
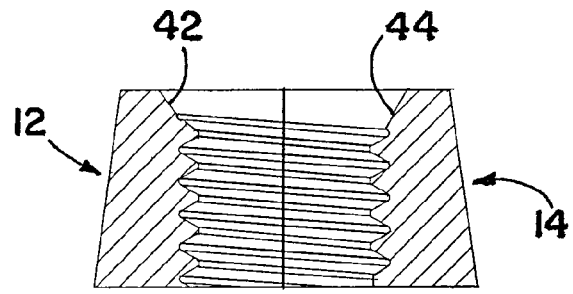
FIG. 8 is a sectional view of the plunger set of FIG. 7.
Figure 9:
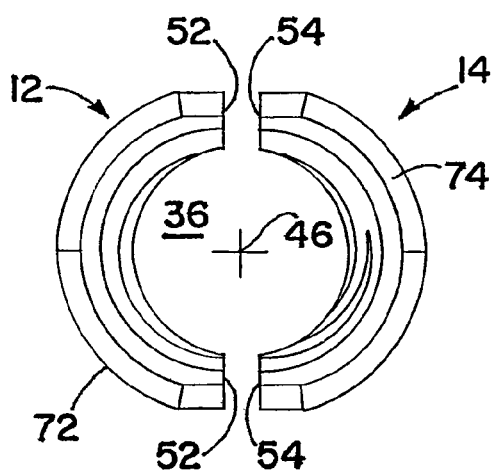
FIG. 9 is a top view of a plunger set of the beam clamp of FIG. 2, with the plunger pieces separated.

Prior to insertion of the threaded rod 30, the plunger set (the plunger pieces 12 and 14) is in a free condition, with the two plunger pieces 12 and 14 together as shown in FIGS. 4 and 7. When the threaded rod 30 pushes through the plunger set 12 and 14, the inserted end of the threaded rod 30 first pushes on chamfers 42 and 44 (FIG. 8) at the bottom of the two plunger pieces 12 and 14. The chamfers 42 and 44 may be angled at an angle of about 35 degrees to a central axis 46, as illustrated in FIG. 8. The central axis 46 is also the axis of the bore 26, and of the inserted threaded rod 30. The pushing of the rod 30 into the plunger set pushes the plunger pieces 12 and 14 apart, further opening a space or opening 36 defined between the plunger pieces 12 and 14, as shown in FIGS. 5 and 9. This allows the threaded rod 30 to pass through the plunger set 12 and 14, between the plunger pieces 12 and 14. The plunger set is also moved longitudinally (axially) along the bore 26 in a direction away from a narrow end 48 of the bore 26, and toward a wide end 50 of the bore 26, against spring biasing force from the spring 18. The movement of the plunger set axially brings it into a wider area of the bore 26, allowing the plunger pieces 12 and 14 to separate from each other.

Figure 10:
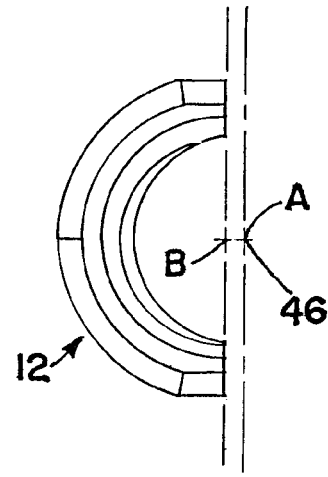
FIG. 10 is a top view of one of the plunger pieces of the plunger set of FIG. 9.

As shown in FIGS. 5 and 9, the plunger pieces 12 and 14 separate from each other by moving apart from one another in a horizontal (radial) direction, not in a circumferential direction. In other words, the plunger pieces 12 and 14 can move horizontally away from each other, as shown in FIG. 9, when the threaded rod 30 is passed through the plunger set 12 and 14. In this separation end faces 52 of the plunger half 12 separate from end faces 54 of the plunger half 14. To allow passage of the threaded rod 30 when the halves 12 and 14 are separated, the minor diameter of the internal threads 32 of the of the plunger pieces 12 and 14 is larger than the major diameter of the external threads 34 of the threaded rod 30. With reference now in addition to FIG. 10, the origin about which the internal threads 32 are laid out is shifted to a center B. The center B is offset from a point A that is the center of the two halves 12 and 14 when the halves are in contact with each other, as in FIG. 7. In other words, the threaded inner surfaces (internal threads) 32 cooperate with one another to produce a threaded receptacle for receiving the external threads 34 of the threaded rod 30 only when the plunger pieces 12 and 14 are not in contact with one another (are separated from one another). In addition, the minor diameter (or minor radius) for internal threads 32 on the plunger set 12 and 14 should be slightly larger than the major diameter of the external threads 34 of the threaded rod 30. This is so that the threaded rod 30 can pass through the plunger set 12 and 14 when the plunger set 12 and 14 is at the open position. In order to minimize the plunger size and housing size, the gap distance between center A and the center B is important.

After the external threads 34 on the threaded rod 30 are engaged with the internal threads 32 on two halves 12 and 14 of the plungers, the two plunger halves 12 and 14 rest on the housing taper bore 26, as shown on FIG. 6. This means that two plunger halves 12 and 14 do not compress the threaded rod 30. Therefore, the threaded rod 30 can freely be rotated relative to the beam clamp 10 whenever height adjustment is needed. A nut 66 (FIGS. 5 and 6) may be used to hold the beam clamp 10 in place at a desired location along the threaded rod 30.

Figure 11:
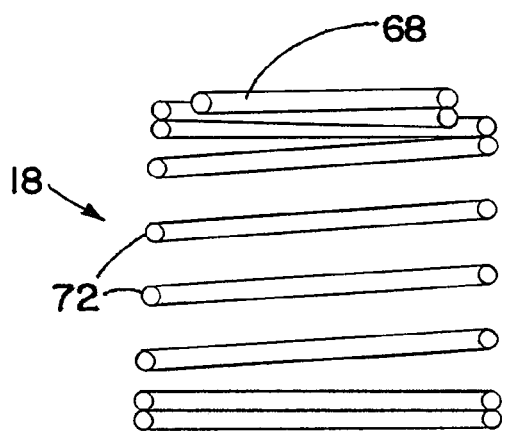
FIG. 11 is a cross-sectional view of a spring used in the beam clamp of FIG. 2.

With reference to FIG. 11, the spring 18 is a tapered coil spring that has a single shoulder coil 68 that engages the threaded hole in between the plunger pieces 12 and 14. The shoulder coil 68 has a smaller radius than the other coils 72 of the spring 18. The shoulder coil 68 keeps the spring 18 from becoming disengaged from the plunger pieces 12 and 14.

The spring 18 is between plunger set (plunger pieces or halves) 12 and 14, and the back plate 20. The back plate 20 is press fit and staked into the housing 24 to encase the spring 18. The back plate 20 instead may be seated, threaded, or coupled to the housing 24. Alternatively the spring 18 may be threaded into or otherwise coupled to the housing 24. On one side the spring 18 presses the plunger pieces 12 and 14, such as being located in the opening 36 (FIG. 9). Alternatively, the spring 18 may press against upper plunger surfaces 72 and 74 (FIGS. 7 and 9) of the plunger pieces 12 and 14, or against washers on top of the plunger pieces 12 and 14. On the opposite side the spring 18 presses against an inner surface 76 of the back plate 20. The back plate 20 has a central hole 80 to allow the threaded rod 30 to pass therethrough. In inserting the threaded rod 30 at least part of the threaded rod 30 may pass through the hole 80. An inward-bent back plate lip 82 may surround the hole 80 and protrude inward into the tapered bore 26 from the inner surface 76. This may aid in securing the spring end in contact with the back plate inner surface 76.

For the beam clamp 10, two mounting methods may be available: top mounting (see FIG. 2) and bottom mounting (FIG. 3). For the conventional beam clamp, the beam clamp is typically upside down for the bottom mounting. However, for the quick lock beam clamp, the beam clamp cannot be upside down for the bottom mounting. Therefore, the beam clamp may have two mounting legs, a top mounting leg and bottom mounting leg, with each mounting leg having an internally threaded hole for the flange mounting screw. For bottom mounting the installer can put the square head (or combo hex head) and cup point set screw into the internal thread hole located at the bottom mounting leg, as shown in FIGS. 2 and 4, for instance. For top mounting the installer can put the square head (or combo hex head) and cup point set screw into the internal thread hole located at the top mounting leg, as shown on FIG. 3. Therefore one quick lock beam clamp can be used for both top mounting and bottom mounting.

Although the threaded rod engagement has been described above in terms of a beam clamp, it will be appreciated that a similar engagement may be part of the other sorts of device described herein, such as anchor bolts and strut nuts.

Figure 12:
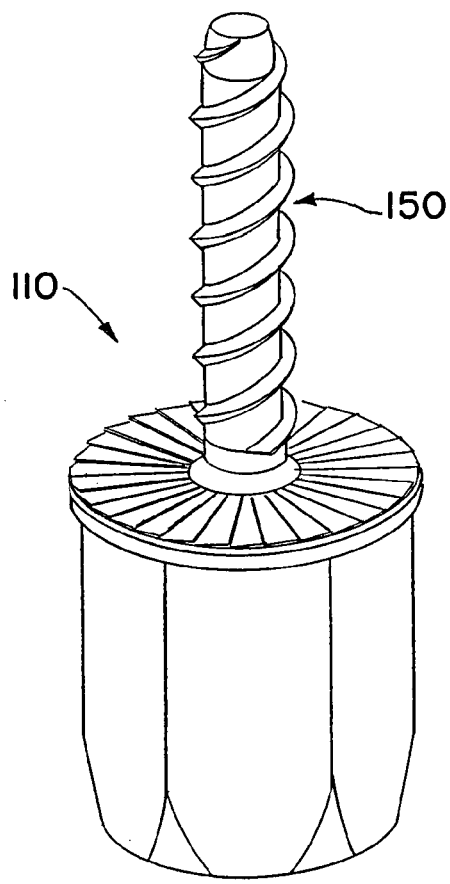
FIG. 12 is an oblique view of another type of threaded rod hanger according to an embodiment of the invention, an anchor bolt.
Figure 13:
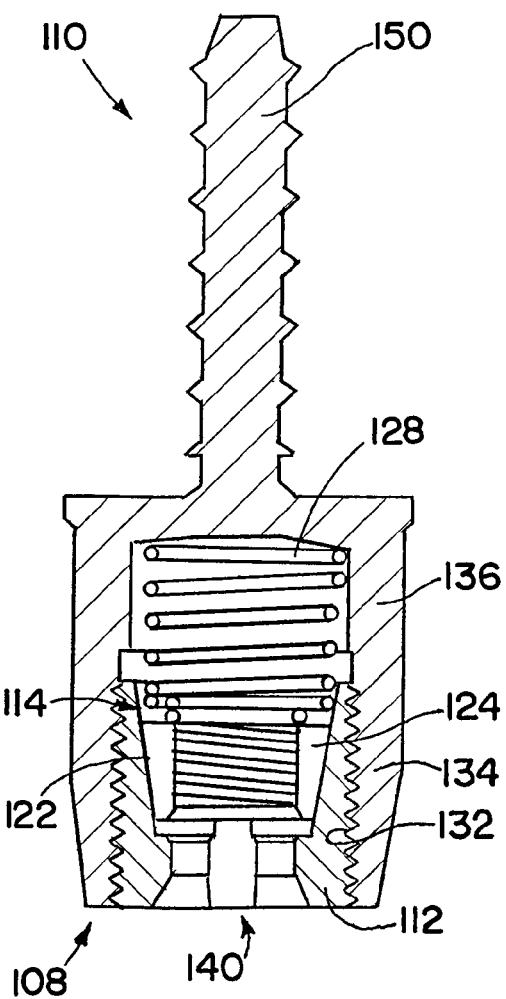
FIG. 13 is a cross-sectional view of the anchor bolt of FIG. 12.

FIGS. 12 and 13 show a quick lock plunger mechanism 108 that is adapted into an anchor bolt as a part of quick lock anchor bolt 110. The anchor bolt is intended to be installed in concrete ceilings and/or decking. FIGS. 12 and 13 shows a specific embodiment, a 0.375 inch (9.5 mm) quick lock anchor bolt, but it will be appreciated that other sizes and configurations are possible.

The quick lock anchor bolt 110 consists of the anchor bolt, a housing insert 112 (part of the housing) with a tapered bore 114, two halves of plungers (plunger halves or pieces) 122 and 124, and shoulder taper spring 128, as shown on FIG. 13. External threads 132 are on the outside wall of the housing insert 112 and internal threads 134 are on the inside wall of the rest of the anchor bolt housing 136, so that two parts are tightened together as shown on FIG. 13. One end of the spring 128 is in contact with part of the anchor bolt housing 136, while the other end of the spring 128 is in contact with the plunger pieces 122 and 124, or a washer on the plunger pieces 122 and 124. The tapered bore in the insert 112 forms a blind hole in the housing of the anchor bolt 110.

The operation of the plunger mechanism 108 is similar to that of the plunger mechanism 8 (FIG. 4) that is described above. Inserting a threaded rod into an opening 140 in the housing insert 112 pushes the plunger pieces 122 and 124 axially upward against the spring force provided by the spring 128. The plunger pieces 122 and 124 separate to allow the threaded rod to enter between them. When the insertion force on the threaded rod is released the spring 128 pushes the plunger pieces 122 and 124 downward against internal walls of the tapered bore 114. The sloped internal bore walls press inward against the sloped external surfaces of the plunger pieces 122 and 124. This causes the internal threads of the plunger pieces 122 and 124 to engage the external threads of the threaded rod. This locks the threaded rod from being pulled out of the housing insert 112, although the threaded rod can still be screwed into or out of the housing insert 112.

The anchor bolt 110 has a wedge anchor 150 on an opposite side from the plunger mechanism 108. The wedge anchor 150 is used to secure the anchor bolt 110 in concrete, such as a concrete ceiling or floor. The wedge anchor 150 is fully threaded, but it will be appreciated that alternatives exist, including partially-threaded wedge anchors and non-wedge anchors.

The anchor bolt 110 may be used to quickly, easily, and removably secure a threaded rod to a concrete structure. The threaded rod can be easily inserted into an anchor bolt that is already secured in concrete, and released so as automatically to lock the threaded rod into place.

Figure 14:
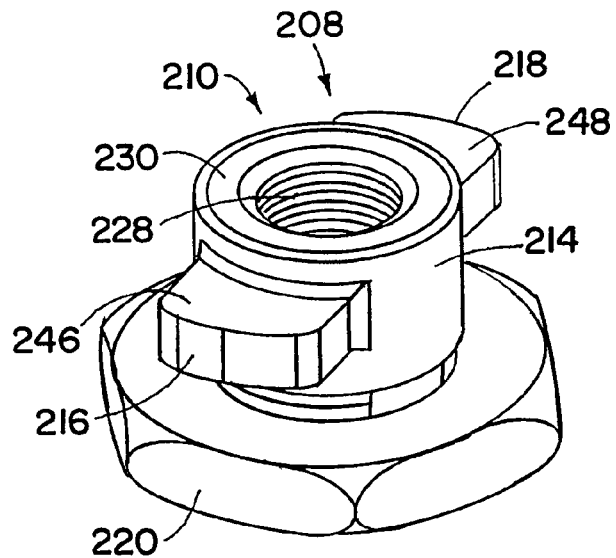
FIG. 14 is an oblique view of yet another type of threaded rod hanger according to an embodiment of the invention, a strut nut.
Figure 15:
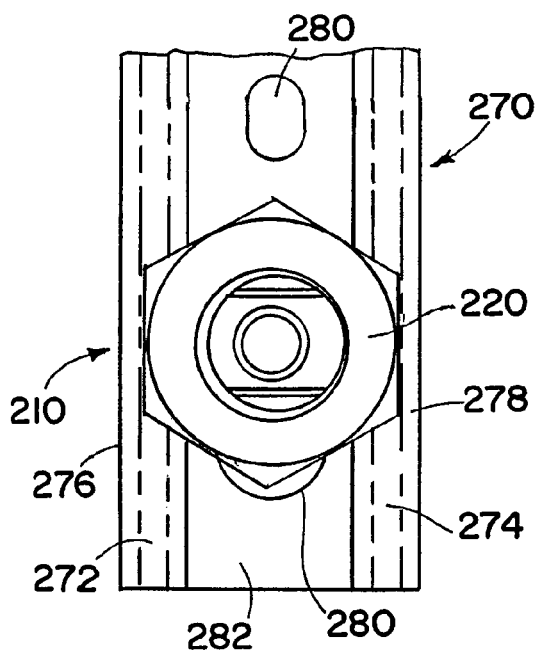
FIG. 15 is a plan view showing the strut nut of FIG. 14 mounted to a top of a strut.
Figure 16:
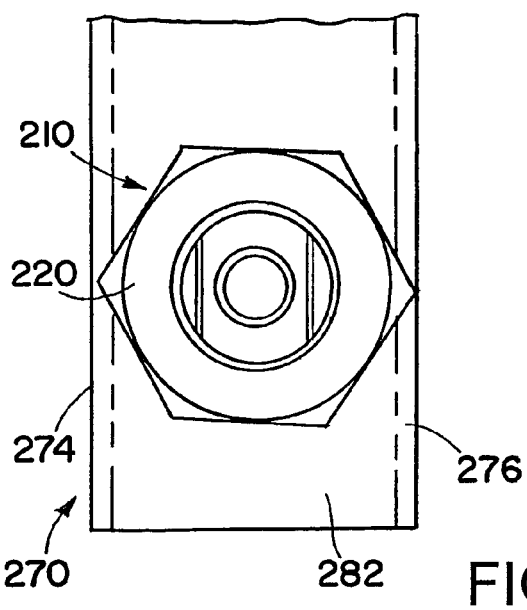
FIG. 16 is a bottom view showing the strut nut of FIG. 14 mounted to a bottom of a strut.

FIGS. 14-17 show various views of a strut nut 210 that includes a quick lock plunger mechanism 208. The quick lock plunger mechanism 208 is adapted into the strut nut as a part of a quick lock strut nut 210. FIG. 14 shows a 0.375 inch (9.5 mm) quick lock strut nut. FIG. 15 shows an example of the top strut mounting and FIG. 16 shows an example of the bottom strut mounting.

Figure 17:
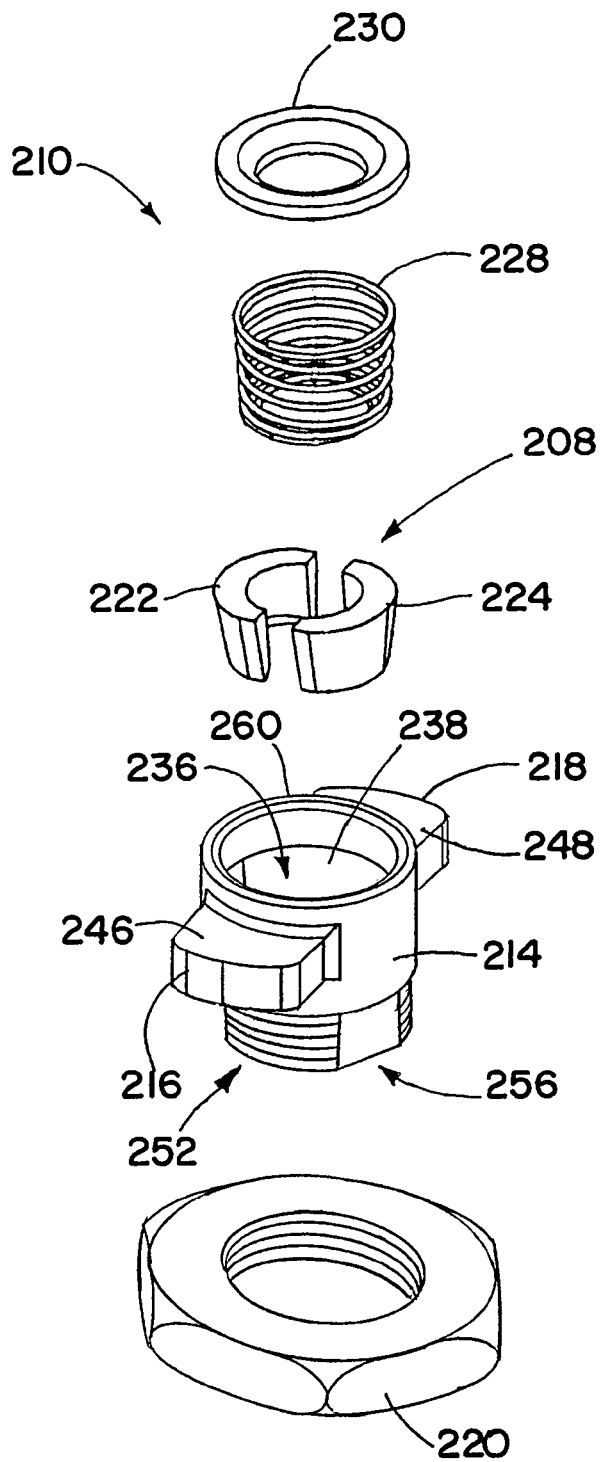
FIG. 17 is an exploded view of the strut nut of FIG. 14.

With reference especially to FIG. 17, the strut nut 210 consists of a housing 214 with cam keys 216 and 218, a jam nut 220, two plunger pieces 222 and 224, a shoulder taper spring 228, and a back plate 230, as shown on FIG. 15. The strut nut housing 214 contains the tapered bore 236 with an inner surface 238 for use as a plunger seat. Two wings 246 and 248 of the strut nut housing 214 have locking cam keys 216 and 218 for engaging a strut. The housing 214 has external threads 252 for the jam nut 220, as well as double D-shape cutouts, such as at 256, for strut bottom mounting. The housing 214 also has a shoulder bore 260 for the back plate seat. The jam nut 220 prevents the horizontal slips from the strut when the load is applied.

Figure 18:
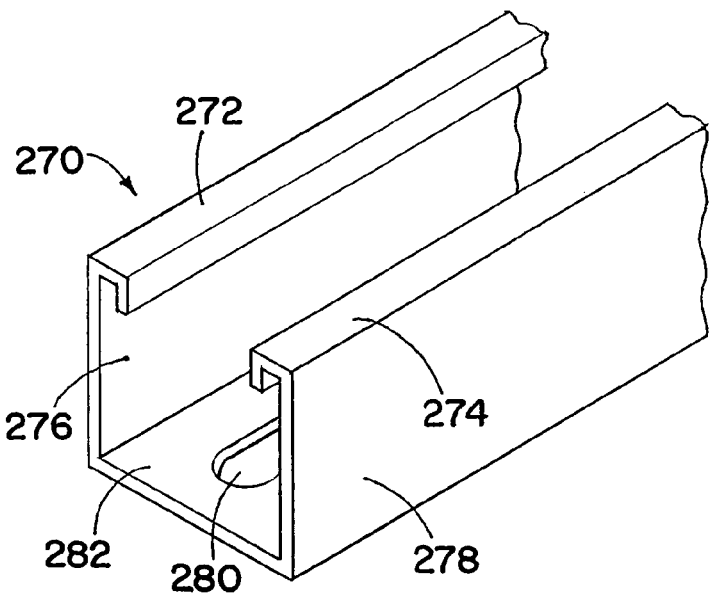
FIG. 18 is an oblique view of a strut used to mount the strut nut of FIG. 14.

The strut nut 210 can engage a strut or channel 270 (FIG. 18) in multiple ways. FIG. 15 shows the strut nut 210 mounted at the top of the strut 270, with the strut nut 210 engaging rails 272 and 274 of the strut 270. The rails 272 and 274 are clamped between the wings 246 and 248 within the strut 270, and the jam nut 220, which is outside of the strut 270 and tightened up to be in contact with the rails 272 and 274. The cam keys 216 and 218 on the ends of the wings 246 and 248 engage side walls 276 and 278 of the strut 270 to prevent rotation of the strut nut 210.

FIG. 16 shows the strut nut 210 mounted on the bottom of the strut 270, with part of the strut nut housing 214 passing through one of the holes 280 (FIGS. 15 and 18) in a base 282 of the strut 270. The base 282 is clamped between the wings 246 and 248, which are inside the strut 270, and the jam nut 220, which is outside of the strut 270 and tightened up to be in contact with the base 282. The cam keys 216 and 218 on the ends of the wings 246 and 248 engage side walls 276 and 278 of the strut 270 to prevent rotation of the strut nut 210.

Regardless of where the strut nut 210 is coupled to the strut 270, the plunger mechanism 208 may be used to receive and lock in place a threaded rod. The operation of the plunger mechanism 208 is similar to the operation of the mechanism 8 described above. The incorporation of the mechanism 208 in the strut nut 210 allows a threaded rod to be quickly and easily secured to a strut that is mounted to structure of various sorts, or being hung from a structure, such as in a trapeze-type arrangement.

Among the advantages of the various embodiments and concepts described herein are: labor savings from the quick-lock push in and lock feature for locking to a threaded rod; pre-fabricated subassembly that does not allow the threaded rod rotation during the assembly; easier assembly for a trapeze; and easier assembly for an anchor bolt.

Figure 19:
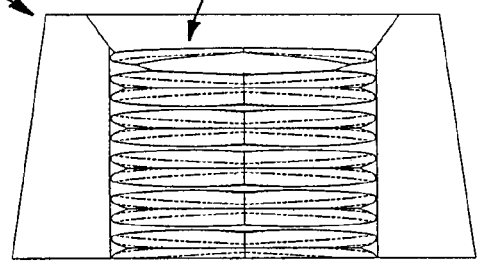
FIG. 19 is a side view of a plunger half according to an alternate embodiment plunger set usable as part of a threaded rod hanger of the present invention.
Figure 20:
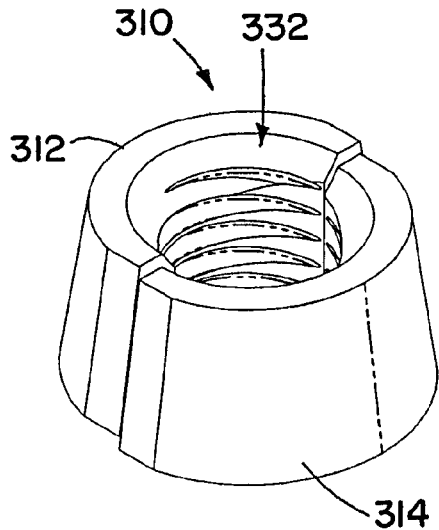
FIG. 20 is an oblique view of a plunger or plunger set formed from two plunger pieces of the type shown in FIG. 19.
Figure 21:
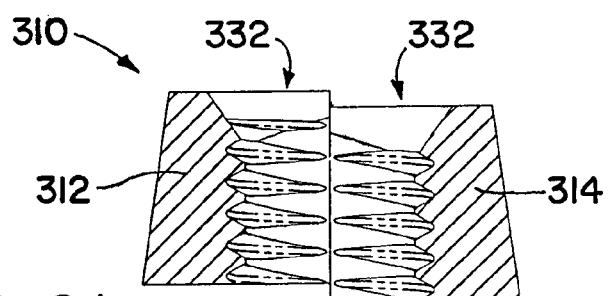
FIG. 21 is a cross-sectional view of the plunger of FIG. 20.

FIGS. 19-21 show an alternate plunger 310 having plunger pieces 312 and 314 that are substantially identical to one another. The plunger pieces 312 and 314 have threaded internal surfaces 332 that combine to make a threaded receptacle for receiving and engaging a threaded rod when the plunger pieces 312 and 314 are offset in a longitudinal direction, as shown in FIGS. 20 and 21, so as to allow the threads from the two plunger pieces 312 and 314 to line up with each other. The threads on the plunger pieces 312 and 314 are each symmetric with regard to the longitudinal direction of the plunger pieces 312 and 314. It will be appreciated that the plunger 310 may be utilized in any of the various sorts of threaded rod hangers described herein.

Figure 23:
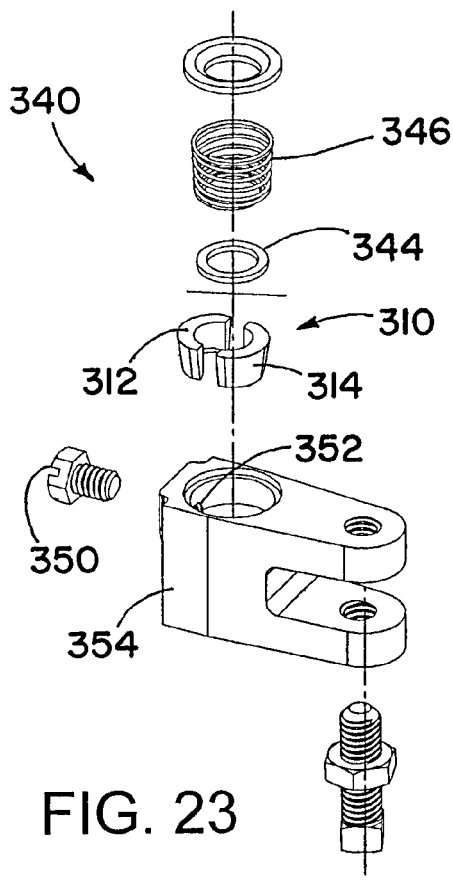
FIG. 23 is an exploded view of the beam clamp of FIG. 22.
Figure 22:
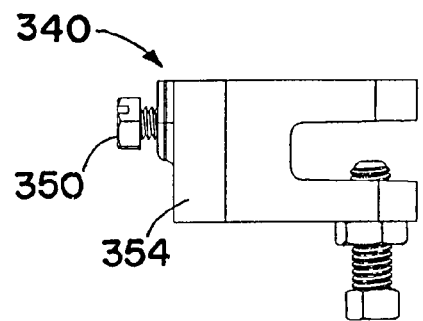
FIG. 22 is a side view of a beam clamp threaded rod hanger according to another embodiment of the invention.

FIGS. 22 and 23 show a beam clamp 340 that includes the plunger set 310. The beam clamp 340 has many parts in common with or similar to corresponding parts of the beam clamp 10 (FIG. 2). These similar parts are not described again with regard to the beam clamp 340. The beam clamp 340 has a washer 344 between the plunger pieces 312 and 314, and a coil spring 346. The washer 344 helps maintain the plunger pieces 312 and 314 in place, preventing collapse (misalignment) of the plunger pieces 312 and 314 when pressed against by a threaded rod having a sharp burr.

The beam clamp 340 also has a set screw or side screw 350 that is threaded into a threaded hole 352 in the clamp body 354. The threaded hole 352 may be substantially perpendicular to an axis of the tapered bore in which the plunger pieces 312 and 314 reside. The set screw 350 can be used to press against the plunger set 310 in order to more tightly secure the plunger pieces 312 and 314 against a threaded rod. The set screw 350 may also be used to prevent uplift of the plunger set 310. Toward that end, the screw 350 may either press against the side surfaces of the plunger set 310, or else may have its tip above the top surfaces (larger-radius end) of the plunger set 310.

Figure 24:
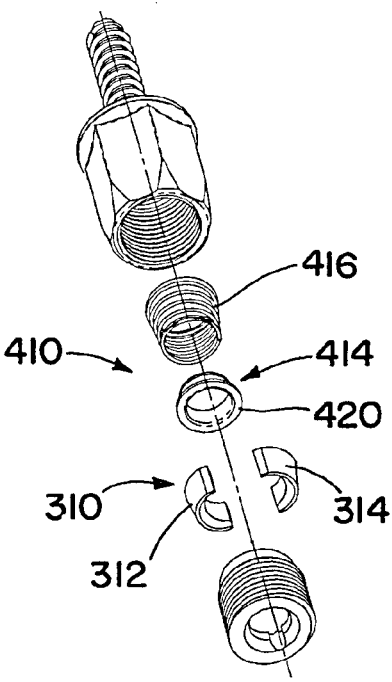
FIG. 24 is an exploded view of still another embodiment of threaded rod hanger according to the invention, an anchor bolt.

FIG. 24 shows an anchor bolt 410 that includes the plunger set 310. The anchor bolt 410 has many parts similar to those of the anchor bolt 110 (FIGS. 12 and 13). One difference is the use of a cap washer 414 between the plunger set 310 and a spring 416. The cap washer 414 has a flange 420 that pressed against top surfaces of the plunger pieces 312 and 314. The opposite end of the cap washer 414 is inserted into an end of the spring 416. This allows the cap washer 414 and the spring 416 to be assembled together.

Figure 25:
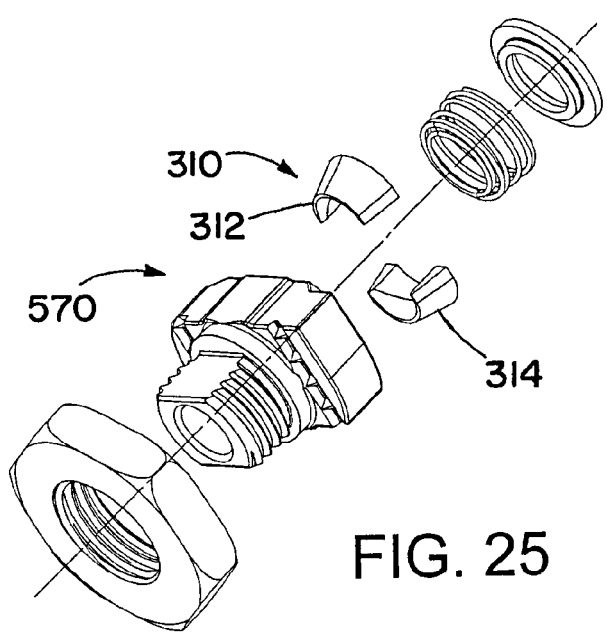
FIG. 25 is an exploded view of a further embodiment of threaded rod hanger according to the invention, a strut nut.

FIG. 25 shows a strut nut 510 that is similar to the strut nut 210 (FIG. 14) in most respects. One difference is that the strut nut 510 incorporates the plunger set 310, with plunger pieces 312 and 314.

The various embodiments shown herein show securement of threaded rods having a substantially vertical orientation. It will be appreciated that threaded rod hangers such as described herein may also be used to mount or be mounted to threaded rods in other orientations, for example horizontal threaded rods. In addition it will be appreciated that different configurations of threaded rod hangers may be used for securing or securing to threaded rods in non-vertical orientations.

Figure 26:
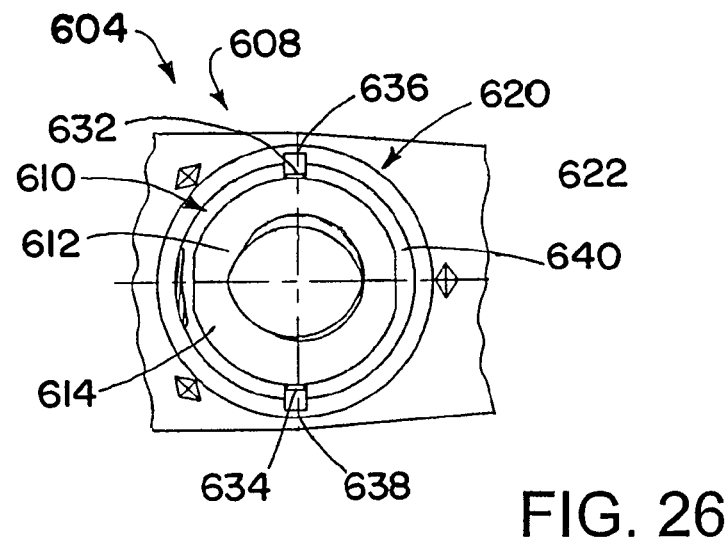
FIG. 26 is a top view of a still further embodiment threaded rod hanger according to the invention.
Figure 27:
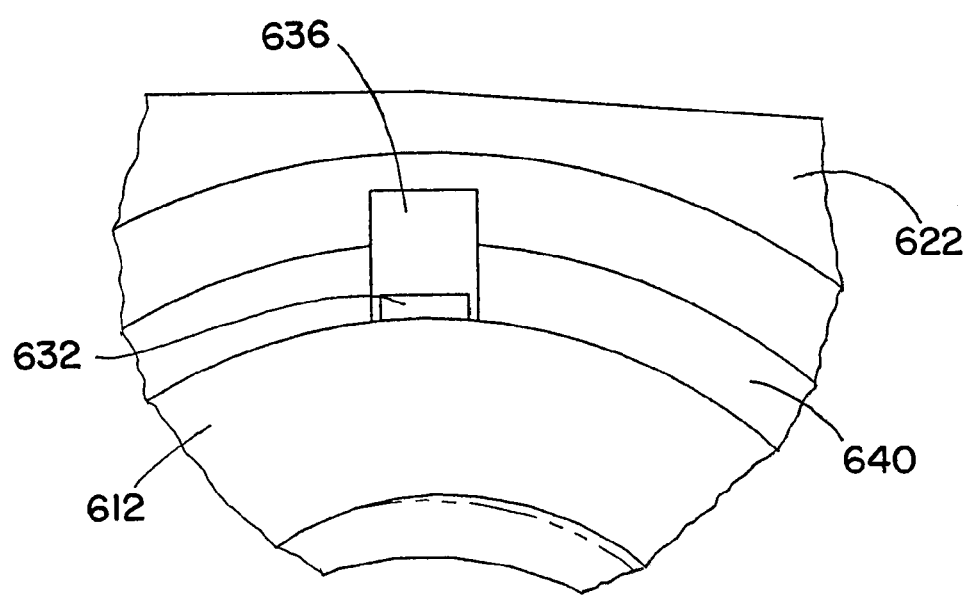
FIG. 27 is a detail view of a portion of the threaded rod hanger of FIG. 26.

FIGS. 26 and 27 show a threaded rod hanger 604 with a quick-lock plunger mechanism 608 that includes a plunger set 610 that in turn includes plunger pieces 612 and 614. The plunger pieces 612 and 614 fit into a tapered bore 620 in a housing 622, as generally described above with regard to other embodiments. The mechanism 608 operates in a manner similar to that described above in other embodiments, and may have other suitable corresponding parts, such as a coil spring and a back plate.

One difference is that the plunger pieces 612 and 614 have radially-outward-protruding keys 632 and 634. The keys 632 and 634 engage corresponding grooves 636 and 638 in the tapered bore surface 640. The keyed connection between the plunger pieces 612 and 614 and the housing 622 helps keep the plunger pieces 612 and 614 properly oriented within the bore 620.

It will be appreciated that the mechanism 608 shown in FIGS. 26 and 27 may be used in any of the types of or specific embodiments of threaded rod hangers described herein. The various features described with regard to various embodiments may be combinable as suitable in a single device.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A threaded rod securement comprising:
a housing having a hole with a tapered inner surface, wherein the tapered inner surface has a wide end and a narrow end;
a threaded rod locking mechanism, wherein the threaded rod locking mechanism includes:
plunger pieces movable within the tapered inner surface, wherein the plunger pieces have sloped outer surfaces that engage the tapered inner surface, and plunger piece inner surfaces for engaging threads of a threaded rod to be placed into the hole; and
a spring within the tapered inner surface providing a spring force biasing the plunger pieces toward the narrow end of the tapered inner surface; and
wherein contact between the outer surfaces of the plunger pieces and the narrow end of the tapered inner surface drives the plunger pieces toward one another and toward a center of the tapered inner surface;
wherein the housing includes an attachment for rotationally attaching the hanger to an additional object;
wherein the attachment is a threaded attachment that makes a threaded connection with the additional object;
wherein the threaded attachment includes a threaded anchor; and
wherein the threaded anchor is coaxial with the hole in the housing.

2. The threaded rod securement of claim 1, wherein the threaded rod securement is an anchor bolt, for anchoring the threaded rod hanger in concrete of the additional object.

3. A threaded rod securement comprising:
a housing having a through hole with a tapered inner surface, wherein the tapered inner surface has a wide end and a narrow end;
a threaded rod locking mechanism, wherein the threaded rod locking mechanism includes:
plunger pieces movable within the tapered inner surface, wherein the plunger pieces have sloped outer surfaces that engage the tapered inner surface, and plunger piece inner surfaces for engaging threads of a threaded rod to be placed into the through hole; and
a spring within the tapered inner surface providing a spring force biasing
the plunger pieces toward the narrow end of the tapered inner surface; and
wherein contact between the outer surfaces of the plunger pieces and the narrow end of the tapered inner surface drives the plunger pieces toward one another and toward a center of the tapered inner surface;
wherein the housing includes an attachment for rotationally attaching the hanger to an additional object;
wherein the attachment is a threaded attachment that makes a threaded connection with the additional object; and
wherein the threaded attachment includes a pair of jaw portions, at least one of which has a threaded hole for receiving a bolt, to secure the additional object between the jaw portions.

4. A threaded rod securement comprising:
a housing having a through hole with a tapered inner surface, wherein the tapered inner surface has a wide end and a narrow end;
a threaded rod locking mechanism, wherein the threaded rod locking mechanism includes:
plunger pieces movable within the tapered inner surface, wherein the plunger pieces have sloped outer surfaces that engage the tapered inner surface, and plunger piece inner surfaces for engaging threads of a threaded rod to be placed into the through hole; and
a spring within the tapered inner surface providing a spring force biasing
the plunger pieces toward the narrow end of the tapered inner surface; and
wherein contact between the outer surfaces of the plunger pieces and the narrow end of the tapered inner surface drives the plunger pieces toward one another and toward a center of the tapered inner surface;

wherein the housing includes an attachment for rotationally attaching the hanger to an additional object; and wherein the attachment includes a pair of wings that engage side walls of the additional object.

5. The threaded rod securement of claim 4, wherein the threaded rod securement is a strut nut.

6. The threaded rod securement of claim 3, wherein at least one of the plunger pieces has a key that engages a groove in the inner surface of the housing.

7. The threaded rod securement of claim 3, wherein the plunger pieces include respective keys that engage respective grooves in the inner surface of the housing.

8. The threaded rod securement of claim 3, wherein substantially all of the sloped outer surfaces of the plunger pieces are in contact with the tapered inner surface of the housing, when the spring presses the plunger pieces toward the narrow end.

9. The threaded rod securement of claim 8, wherein the sloped outer surfaces contact the tapered inner surface of the housing from a top edge of the sloped outer surfaces to a bottom edge of the sloped outer surfaces.

10. The threaded rod securement of claim 3, wherein the tapered inner surface is a tapered bore.

11. The threaded rod securement of claim 3, wherein the inner surfaces of the plunger pieces are threaded surfaces.

12. The threaded rod securement of claim 3, in combination with the threaded rod.

13. The threaded rod securement of claim 3, in combination with the additional object.

14. The threaded rod securement of claim 4, wherein at least one of the plunger pieces has a key that engages a groove in the inner surface of the housing.

15. The threaded rod securement of claim 4, wherein the plunger pieces include respective keys that engage respective grooves in the inner surface of the housing.

16. The threaded rod securement of claim 4, wherein substantially all of the sloped outer surfaces of the plunger pieces are in contact with the tapered inner surface of the housing, when the spring presses the plunger pieces toward the narrow end.

17. The threaded rod securement of claim 16, wherein the sloped outer surfaces contact the tapered inner surface of the housing from a top edge of the sloped outer surfaces to a bottom edge of the sloped outer surfaces.

18. The threaded rod securement of claim 4, wherein the tapered inner surface is a tapered bore.

19. The threaded rod securement of claim 4, wherein the inner surfaces of the plunger pieces are threaded surfaces.

20. The threaded rod securement of claim 4, in combination with the threaded rod.

21. The threaded rod securement of claim 4,
in combination with the additional object;
wherein the additional object includes a strut, with the wings engaging side walls of the strut.

22. The threaded rod securement of claim 1, wherein the threaded anchor and the housing constitute a unitary, monolithic, single piece of continuous material.

23. The threaded rod securement of claim 1, wherein the treaded anchor extends from the housing in a direction away from an opening in the housing that allows access to the hole.

24. The threaded rod securement of claim 1, wherein at least one of the plunger pieces has a key that engages a groove in the inner surface of the housing.

25. The threaded rod securement of claim 1, wherein the plunger pieces include respective keys that engage respective grooves in the inner surface of the housing.

26. The threaded rod securement of claim 1, wherein substantially all of the sloped outer surfaces of the plunger pieces are in contact with the tapered inner surface of the housing, when the spring presses the plunger pieces toward the narrow end.

27. The threaded rod securement of claim 26, wherein the sloped outer surfaces contact the tapered inner surface of the housing from a top edge of the sloped outer surfaces to a bottom edge of the sloped outer surfaces.

28. The threaded rod securement of claim 1, wherein the tapered inner surface is a tapered bore.

29. The threaded rod securement of claim 1, wherein the inner surfaces of the plunger pieces are threaded surfaces.

30. The threaded rod securement of claim 1, in combination with the threaded rod.

* * * * *